United States Patent
Anderson, Jr. et al.

(10) Patent No.: US 8,239,910 B2
(45) Date of Patent: Aug. 7, 2012

(54) VIDEO/AUDIO SYSTEM AND METHOD ENABLING A USER TO SELECT DIFFERENT VIEWS AND SOUNDS ASSOCIATED WITH AN EVENT

(75) Inventors: Tazwell L. Anderson, Jr., Atlanta, GA (US); Mark A. Wood, Decatur, GA (US)

(73) Assignee: Immersion Entertainment, Atlanta, GA (US)

( * ) Notice: Subject to any disclaimer, the term of this patent is extended or adjusted under 35 U.S.C. 154(b) by 810 days.

(21) Appl. No.: 11/932,449

(22) Filed: Oct. 31, 2007

(65) Prior Publication Data

US 2008/0287059 A1    Nov. 20, 2008

Related U.S. Application Data

(63) Continuation of application No. 10/453,385, filed on Jun. 3, 2003, now abandoned, which is a continuation of application No. 09/322,411, filed on May 28, 1999, now Pat. No. 6,578,203.

(60) Provisional application No. 60/123,341, filed on Mar. 8, 1999.

(51) Int. Cl.
*H04N 7/173* (2006.01)

(52) U.S. Cl. ........... 725/118; 725/63; 725/135; 348/157

(58) Field of Classification Search .................... 725/74, 725/82, 105, 63, 135; 348/157–159
See application file for complete search history.

(56) References Cited

U.S. PATENT DOCUMENTS

| | | |
|---|---|---|
| 4,472,830 A | 9/1984 | Nagai |
| 4,479,150 A | 10/1984 | Ilmer et al. |
| 4,486,897 A | 12/1984 | Nagai |
| 4,504,861 A | 3/1985 | Dougherty |
| 4,572,323 A | 2/1986 | Randall |
| 4,580,174 A | 4/1986 | Tokunaka |
| 4,605,950 A | 8/1986 | Goldberg et al. |
| 4,615,050 A | 10/1986 | Lonnstedt |

(Continued)

FOREIGN PATENT DOCUMENTS

GB    2372892    9/2002

(Continued)

OTHER PUBLICATIONS

PCT International Search Report dated Feb. 5, 2004; In re International Application No. PCT/US03/31696.

(Continued)

*Primary Examiner* — Ngoc Vu

(74) *Attorney, Agent, or Firm* — The Small Patent Law Group LLC

(57) ABSTRACT

A video/audio system includes an interface device that receives a plurality of audio and video signals from a plurality of sources. The interface device combines these signals into various combinations and transmits the combinations to a receiver. The receiver is configured to interface one of the combinations of signals with a user. In this regard, the receiver allows the user to select one of the combinations, and in response, the receiver separates the video signal(s) of the selected combination from the audio signal(s) of the selected combination. Then, the receiver renders the video signal(s) via a display device and produces a sound defined by the audio signal(s) via a speaker. Accordingly, the user is able to control which set of audio and video signals are interfaced with the user.

21 Claims, 3 Drawing Sheets

U.S. PATENT DOCUMENTS

| | | |
|---|---|---|
| 4,620,068 A | 10/1986 | Wieder |
| 4,665,438 A | 5/1987 | Miron |
| 4,727,585 A | 2/1988 | Flygstad |
| 4,764,817 A | 8/1988 | Blazek et al. |
| 4,802,243 A | 2/1989 | Griffiths |
| 4,809,079 A | 2/1989 | Blazek et al. |
| 4,855,827 A | 8/1989 | Best |
| 4,856,118 A | 8/1989 | Sapiejewski |
| 4,864,425 A | 9/1989 | Blazek et al. |
| 4,866,515 A | 9/1989 | Tagawa et al. |
| 4,887,152 A | 12/1989 | Matsuzaki et al. |
| 4,965,825 A | 10/1990 | Harvey et al. |
| 4,982,278 A | 1/1991 | Dahl et al. |
| 5,023,707 A | 6/1991 | Briggs |
| 5,023,955 A | 6/1991 | Murphy, II et al. |
| 5,109,414 A | 4/1992 | Harvey et al. |
| 5,119,442 A | 6/1992 | Brown |
| 5,128,765 A | 7/1992 | Dingwall et al. |
| 5,138,440 A | 8/1992 | Radice |
| 5,138,722 A | 8/1992 | Urella et al. |
| 5,173,721 A | 12/1992 | Green |
| 5,179,736 A | 1/1993 | Scanlon |
| 5,189,630 A | 2/1993 | Barstow et al. |
| 5,237,648 A | 8/1993 | Mills et al. |
| 5,243,415 A | 9/1993 | Vance |
| 5,252,069 A | 10/1993 | Lamb et al. |
| 5,289,272 A | 2/1994 | Rabowsky et al. |
| 5,289,288 A | 2/1994 | Silverman et al. |
| 5,297,037 A | 3/1994 | Ifuku |
| 5,321,416 A | 6/1994 | Bassett et al. |
| 5,359,463 A | 10/1994 | Shirochi et al. |
| 5,392,158 A | 2/1995 | Tosaki |
| 5,408,686 A | 4/1995 | Mankovitz |
| 5,414,544 A | 5/1995 | Aoyagi et al. |
| 5,440,197 A | 8/1995 | Gleckman |
| 5,448,291 A | 9/1995 | Wickline |
| 5,463,428 A | 10/1995 | Lipton et al. |
| 5,481,478 A | 1/1996 | Palmieri et al. |
| 5,485,504 A | 1/1996 | Ohnsorge |
| 5,506,705 A | 4/1996 | Yamamoto et al. |
| 5,510,828 A | 4/1996 | Lutterbach |
| 5,513,384 A | 4/1996 | Brennan et al. |
| 5,524,195 A | 6/1996 | Clanton et al. |
| 5,546,099 A | 8/1996 | Quint et al. |
| 5,583,562 A * | 12/1996 | Birch et al. ............. 725/151 |
| 5,585,850 A | 12/1996 | Schwaller |
| 5,585,858 A | 12/1996 | Harper et al. |
| 5,594,551 A | 1/1997 | Monta |
| 5,598,208 A | 1/1997 | McClintock |
| 5,600,365 A | 2/1997 | Kondo et al. |
| 5,600,368 A | 2/1997 | Matthews, III |
| 5,613,191 A | 3/1997 | Hylton et al. |
| 5,617,331 A | 4/1997 | Wakai et al. |
| 5,627,915 A | 5/1997 | Rosser et al. |
| 5,631,693 A | 5/1997 | Wunderlich et al. |
| 5,642,221 A | 6/1997 | Fischer et al. |
| 5,663,717 A | 9/1997 | DeLuca |
| 5,668,339 A | 9/1997 | Shin |
| 5,671,320 A | 9/1997 | Cookson et al. |
| 5,682,172 A | 10/1997 | Travers et al. |
| 5,696,521 A | 12/1997 | Robinson et al. |
| 5,708,961 A | 1/1998 | Hylton et al. |
| 5,712,950 A | 1/1998 | Cookson et al. |
| 5,719,588 A | 2/1998 | Johnson |
| 5,729,471 A | 3/1998 | Jain et al. |
| 5,729,549 A | 3/1998 | Kostreski et al. |
| 5,742,263 A | 4/1998 | Wang et al. |
| 5,742,521 A | 4/1998 | Ellenby et al. |
| 5,754,254 A | 5/1998 | Kobayashi et al. |
| 5,760,819 A | 6/1998 | Sklar et al. |
| 5,760,824 A | 6/1998 | Hicks, III |
| 5,760,848 A * | 6/1998 | Cho ............................ 348/839 |
| 5,767,820 A | 6/1998 | Bassett et al. |
| 5,793,416 A | 8/1998 | Rostoker et al. |
| 5,806,005 A | 9/1998 | Hull et al. |
| 5,808,695 A | 9/1998 | Rosser et al. |
| 5,812,224 A | 9/1998 | Maeda et al. |
| 5,815,126 A | 9/1998 | Fan et al. |
| 5,841,122 A | 11/1998 | Kirchhoff |
| 5,844,656 A | 12/1998 | Ronzani et al. |
| 5,847,612 A | 12/1998 | Birleson |
| 5,847,762 A | 12/1998 | Canfield et al. |
| 5,867,223 A | 2/1999 | Schindler et al. |
| 5,867,579 A | 2/1999 | Saito |
| 5,880,773 A | 3/1999 | Suzuki |
| 5,892,554 A | 4/1999 | DiCicco et al. |
| 5,894,320 A | 4/1999 | Vancelette |
| 5,900,849 A | 5/1999 | Gallery |
| 5,903,395 A | 5/1999 | Rallison et al. |
| 5,920,827 A | 7/1999 | Baer et al. |
| 5,946,635 A | 8/1999 | Dominguez |
| D413,881 S | 9/1999 | Ida et al. |
| 5,953,076 A | 9/1999 | Astle et al. |
| 5,982,445 A | 11/1999 | Eyer et al. |
| 5,986,803 A | 11/1999 | Kelly |
| 5,990,958 A | 11/1999 | Bheda et al. |
| 5,999,808 A | 12/1999 | LaDue |
| 6,002,720 A | 12/1999 | Yurt et al. |
| 6,002,995 A | 12/1999 | Suzuki et al. |
| 6,009,336 A | 12/1999 | Harris et al. |
| 6,016,348 A | 1/2000 | Blatter et al. |
| 6,020,851 A | 2/2000 | Busack |
| 6,034,716 A | 3/2000 | Whiting et al. |
| 6,035,349 A | 3/2000 | Ha et al. |
| 6,043,837 A | 3/2000 | Driscoll, Jr. et al. |
| 6,052,239 A | 4/2000 | Matsui et al. |
| 6,060,995 A | 5/2000 | Wicks et al. |
| 6,064,860 A | 5/2000 | Ogden |
| 6,069,668 A | 5/2000 | Woodham, Jr. et al. |
| D426,527 S | 6/2000 | Sakaguchi |
| 6,078,954 A | 6/2000 | Lakey et al. |
| 6,080,063 A | 6/2000 | Khosla |
| 6,084,584 A | 7/2000 | Nahi et al. |
| 6,088,045 A | 7/2000 | Lumelsky et al. |
| 6,095,423 A | 8/2000 | Houdeau et al. |
| 6,097,441 A | 8/2000 | Allport |
| 6,100,925 A | 8/2000 | Rosser et al. |
| 6,104,414 A | 8/2000 | Odryna et al. |
| 6,112,074 A | 8/2000 | Pinder |
| 6,121,966 A | 9/2000 | Teodosio et al. |
| 6,124,862 A | 9/2000 | Boyken et al. |
| 6,125,259 A | 9/2000 | Perlman |
| 6,128,143 A | 10/2000 | Nalwa |
| 6,131,025 A | 10/2000 | Riley et al. |
| 6,133,946 A | 10/2000 | Cavallaro et al. |
| 6,137,525 A | 10/2000 | Lee et al. |
| 6,144,375 A | 11/2000 | Jain et al. |
| 6,166,734 A | 12/2000 | Nahi et al. |
| 6,192,257 B1 | 2/2001 | Ray |
| 6,195,090 B1 | 2/2001 | Riggins, III |
| 6,209,028 B1 | 3/2001 | Walker et al. |
| 6,215,475 B1 | 4/2001 | Meyerson et al. |
| 6,327,570 B1 | 12/2001 | Stevens |
| 6,330,021 B1 | 12/2001 | Devaux |
| 6,347,301 B1 | 2/2002 | Bearden, III et al. |
| 6,351,252 B1 | 2/2002 | Atsumi et al. |
| 6,356,905 B1 | 3/2002 | Gershman et al. |
| 6,380,978 B1 | 4/2002 | Adams et al. |
| 6,401,085 B1 | 6/2002 | Gershman et al. |
| 6,417,853 B1 | 7/2002 | Squires et al. |
| 6,421,031 B1 | 7/2002 | Ronzani et al. |
| 6,424,369 B1 | 7/2002 | Adair et al. |
| 6,434,403 B1 | 8/2002 | Ausems et al. |
| 6,434,530 B1 | 8/2002 | Sloane et al. |
| 6,463,299 B1 | 10/2002 | Macor |
| 6,466,202 B1 | 10/2002 | Suso et al. |
| 6,505,055 B1 | 1/2003 | Kahn et al. |
| 6,522,352 B1 | 2/2003 | Strandwitz et al. |
| 6,525,762 B1 | 2/2003 | Mileski et al. |
| 6,526,580 B2 | 2/2003 | Shimomura |
| 6,532,152 B1 | 3/2003 | White et al. |
| 6,535,254 B1 | 3/2003 | Olsson et al. |
| 6,535,493 B1 | 3/2003 | Lee et al. |
| 6,549,229 B1 | 4/2003 | Kirby et al. |
| 6,564,070 B1 | 5/2003 | Nagamine et al. |
| 6,567,079 B1 | 5/2003 | Smailagic et al. |
| 6,570,889 B1 | 5/2003 | Stirling-Gallacher et al. |

| | | | |
|---|---|---|---|
| 6,574,672 | B1 | 6/2003 | Mitchell et al. |
| 6,578,203 | B1 | 6/2003 | Anderson, Jr. et al. |
| 6,597,346 | B1 | 7/2003 | Havey et al. |
| 6,624,846 | B1 | 9/2003 | Lassiter |
| 6,669,346 | B2 | 12/2003 | Metcalf |
| 6,681,398 | B1 | 1/2004 | Verna |
| 6,781,635 | B1 | 8/2004 | Takeda |
| 6,782,238 | B2 | 8/2004 | Burg et al. |
| 6,785,814 | B1 | 8/2004 | Usami et al. |
| 6,931,290 | B2 | 8/2005 | Forest |
| 6,934,510 | B2 | 8/2005 | Katayama |
| 6,961,430 | B1 | 11/2005 | Gaske et al. |
| 7,006,164 | B1 | 2/2006 | Morris |
| 7,149,549 | B1 | 12/2006 | Ortiz |
| 7,210,160 | B2 | 4/2007 | Anderson, Jr. et al. |
| 7,227,952 | B2 | 6/2007 | Qawami et al. |
| 7,268,810 | B2 | 9/2007 | Yoshida |
| 7,448,063 | B2 | 11/2008 | Freeman et al. |
| 2001/0016486 | A1 | 8/2001 | Ko |
| 2001/0030612 | A1 | 10/2001 | Kerber et al. |
| 2001/0034734 | A1 | 10/2001 | Whitley et al. |
| 2001/0039180 | A1 | 11/2001 | Sibley et al. |
| 2001/0039663 | A1 | 11/2001 | Sibley |
| 2001/0042105 | A1 | 11/2001 | Koehler et al. |
| 2001/0047516 | A1 | 11/2001 | Swain et al. |
| 2002/0007490 | A1 | 1/2002 | Jeffery |
| 2002/0046405 | A1 | 4/2002 | Lahr |
| 2002/0052965 | A1 | 5/2002 | Dowling |
| 2002/0057365 | A1 | 5/2002 | Brown |
| 2002/0063799 | A1 | 5/2002 | Ortiz et al. |
| 2002/0069416 | A1 | 6/2002 | Stiles |
| 2002/0069419 | A1 | 6/2002 | Raverdy et al. |
| 2002/0090217 | A1 | 7/2002 | Limor et al. |
| 2002/0091723 | A1 | 7/2002 | Traner et al. |
| 2002/0095682 | A1 | 7/2002 | Ledbetter |
| 2002/0104092 | A1 | 8/2002 | Arai et al. |
| 2002/0108125 | A1 | 8/2002 | Joao |
| 2002/0115454 | A1 | 8/2002 | Hardacker |
| 2002/0122137 | A1* | 9/2002 | Chen et al. ............ 348/552 |
| 2002/0130967 | A1 | 9/2002 | Sweetser |
| 2002/0138582 | A1 | 9/2002 | Chandra et al. |
| 2002/0138587 | A1 | 9/2002 | Koehler |
| 2002/0152476 | A1 | 10/2002 | Anderson et al. |
| 2003/0004793 | A1 | 1/2003 | Feuer et al. |
| 2003/0005052 | A1 | 1/2003 | Feuer et al. |
| 2003/0005437 | A1 | 1/2003 | Feuer et al. |
| 2003/0005457 | A1 | 1/2003 | Faibish et al. |
| 2003/0014275 | A1 | 1/2003 | Bearden, III et al. |
| 2003/0023974 | A1 | 1/2003 | Dagtas et al. |
| 2003/0204630 | A1 | 10/2003 | Ng |
| 2004/0034617 | A1 | 2/2004 | Kaku |
| 2004/0073437 | A1 | 4/2004 | Halgas et al. |
| 2004/0207719 | A1 | 10/2004 | Tervo et al. |
| 2004/0243922 | A1 | 12/2004 | Sirota et al. |
| 2005/0076387 | A1 | 4/2005 | Feldmeier |
| 2006/0174297 | A1 | 8/2006 | Anderson et al. |
| 2007/0107028 | A1 | 5/2007 | Monroe |

FOREIGN PATENT DOCUMENTS

| | | |
|---|---|---|
| JP | 10136277 | 5/1998 |
| JP | 20010275101 | 10/2001 |
| WO | WO 9411855 | 5/1994 |
| WO | WO 9966670 | 12/1999 |
| WO | WO 0054554 | 9/2000 |
| WO | WO-2004/002130 A2 | 12/2003 |

OTHER PUBLICATIONS

Written Opinion cited document in International Application No. PCT/US03/31696.
Spanberg, Erik; "Techies Hit the Fast Track"; The Business Journal. charlotte: Jul. 30, 1999; vol. 14, Iss. 17; pp. 3.
Hiestand, Michael; Up Next: Rent Wireless Video Devices at games: [Final Edition]; USA Today; McLean, VA: Jan. 29, 2002; pgs. 2.
PR Newswire; Baseball Fans to Get Best of Both Worlds: Seats in the Stadium and Up Close Camera Shots; New York; Mar. 22, 2002; 2 pgs.
Ron Glover; "Armchair Baseball From the WEB—or Your Stadium Seat"; copyright 1998 ; The McGraw-Hill Companies, Inc.; 2 pgs.
Choiceseat™ Fact Sheet; Jun. 13, 2007; 4 pgs.
ChoiceSeat—Events Operations Manual for Madison Square Garden; Dec. 15; 1999; Intel Corporation; 91 pgs.
ChoiceSeat™; www.choiceseat.net; 1999 Williams Communications; 71 pgs.
ChoiceSeat—System Adminstrator's Binder for Madison Square Garden; Dec. 17, 1999; 80 pgs.
ChoiceSeat—In Your Face Interactive Experience—1998 Superbowl; Broncos v. Packers; 15 pgs.
In-Seat Interactive Advertising Device Debuts; Nov. 19, 1999; Williams; 2 pgs.
Reality Check Studios Goes Broadband with Production for Choiceseat at Madison Square Garden; Dec. 1, 1999; 3 pgs.
Press Release: Vela ReSearch LP to Supply Encoding for ChoiceSeat at SuperBowl XXXII; Jan. 13, 1998; 2 pgs.
Ruel's Report: ChoiceSeat; ChoiceSeat makes Worldwide Debut at the 1998 Super Bowl in San Diego California; Sep. 1, 1997; 9 pgs.
San Diego Metropolitan; Jan. 1998; 29 pgs.
Stadium fans touch the future—Internet Explorer and touch screens add interactivity to Super Bowl XXXII, Jan. 26, 1998; 2 pgs.
Telephony online Intelligence for the Broadband Economy; Fans take to ChoiceSeats: Interactive technology, e-commerce expand to sporting events; Jan. 10, 2000; 2 pgs.
Williams ChoiceSeat interactive network launches inaugural Season with Tampa Bay Devil Rays; expands features for second season; Mar. 30, 1998; 2 pgs.
Williams Communications; ChoiceSeat™ demonstrates the interactive evolution of sports at Super Bowl™ XXXIII; Jan. 20, 1999; 2 pgs.
ChoiceSeat The Premiere Provider of Interactive Event Entertainment; 18 pgs.
Choice Seat Specification; Version 2.2; Ethernet Model; Williams Communications Group; Oct. 10, 1997; 13 pgs.
ChoiceSeat Intellectual Property List; 3 pgs.
CSI Incorporated Draft; Schedule A-IP; Schedule of Patents; 2 pgs.
HK-388P/PW Color Camera Operation Manual; vol. 2; Ikegami; 280 pgs.
Eric Breier; Computer age comes to ballpark; Quallcomm is test site for ChoiceSeat's sports television network; Aug. 1997; 2 pgs.
Robert Carter; Web Technology: It's in the Game; SiteBuilder network; Dec. 15, 1997; 1 pg.
ChoiceSeat™ Fact Sheet; Project: Super Bowl XXXII; Qualcomm Stadium, San Diego, Calif., USA; Jan. 25, 1998; 1 pg.
Screen Shot Super Bowl XXXII; Jan. 25, 1998; 1 pg.
Vyvx® ChoiceSeat Cover; 1 pg.
Welcome to the Interactive Evolution of Sports. ChoiceSeat™; Jan. 1998; 1 pg.
The Ultimate Super Bowl Experience! Williams ChoiceSeat™ Jan. 1998; 1 pg.
Bradley J. Fikes; Super Bowl XXXII; It's just business; for lucky 600 fans; there'll be TV sets at the seats; San Diego North County Times; Jan. 1998; 1 pg.
D.R. Stewart; Williams Interactive Video Gives Football Fans Choice; Tulsa World; Jan. 1998; tulsaworld.com; 2 pgs.
ChoiceSeat Handout; Welcome to the Interactive Evolution of Sports. www.choiceseat.net; 1 pg.
Cyberscope; Just Call It Wired Bowl; Jan. 28, 1998; 1 pg.
Ruel.Net Set-Top Page Interactive TV Top.Box.News; Ruel's Report: ChoiceSeat; Fall 1998; 7 pgs.
Williams ChoiceSeat interactive network launches inaugural season with Tampa Bay Devil Rays; expands features for second season with San Diego Padres; www.williams.com/newsroom/news_releases; Mar. 30, 1998: 2 pgs.
The Herald: Super Bowl Turns Techno Bowl; Jan. 24, 1999; 1 pg.
Williams Communications ChoiceSeat™ demonstrates the interactive evolution of sports at Super Bowl™ XXXIII; http://www.williams.com/newsroom/news_releases; Jan. 20, 1999; 3 pgs.
NTN Interactive games available on ChoiceSeat™ during Super Bowl XXXIII; Jan. 1999; 1 pg.
Williams Fact Sheet; Super Bowl™ XXXIII; Pro Player Stadium, Miami, Florida, USA; Jan. 31, 1999; 1 pg.
Super Bowl XXXIII Game Recap; http://www.nfl.com/superbowl/history/recap/sbxxxiii; 8 pgs.

ChoiceSeat™ User Guide; New York Knicks; The Garden Fanlink; 8 pgs.

ChoiceSeat™ User Guide; New York Rangers; The Garden Fanlink; 8 pgs.

ChoiceSeat™ Flow Chart; New York Knicks; The Garden Fanlink; 1 pg.

ChoiceSeat™ Presentation Document; The "Be There" Experience; 15 pgs.

In-Seat Interactive Advertising Device Debuts; http://www.williams.com/newsroom/news_releases; Nov. 19, 1999; 2 pgs.

Intel and ChoiceSeat™ collaborate to advance interactive sports technology; http://www.williams.com/newsroom/news_releases; Nov. 29, 1999; 3 pgs.

Media Coverage; ChoiceSeat The Interactive Evolution of Sports; Good News Travels Fast.; 1 pg.

Screen Shot: ChoiceSeat the Interactive Evolution of Sports; 1 pg.

Digital Video; ChoiceSeat Coverage; www.dv.com; Apr. 2000; 11 pgs.

Wall Street Journal; With Wired Seats, Fans Get Replays, Rules, Snacks; May 21, 2000; 1 pg.

Wireless History; www.jhsph.edu/wireless/story; 5 pgs.

Wikipedia; Wireless LAN; 4 pgs.

Proposed ChoiceSeat Client Specification Summary; Initial Draft Aug. 29, 1997; Updated Sep. 30, 1997; 2 pgs.

Proposed ChoiceSeat Network Specification Summary; Initial Draft Aug. 25, 1997; 2 pgs.

Proposed ChoiceSeat Network Specification Summary; Updated Draft Sep. 30, 1997; 4 pgs.

Quallcomm Stadium ChoiceSeat Network Diagram; May 11, 1998; 5 pgs.

Schedule of Personal Property; Patents; Software and Trademarks etc Draft; 3 pgs.

SGI and the Pepsi Center; 2 pgs.

Adamson, W.A., Antonelli, C.J.; Coffman, K.W.; McDaniel, P.; Rees, J.; Secure Distributed Virtual Conferencing Multicast or Bust; CITI Technical Report 99-1; Jan. 25, 1999; 8 pgs.

Wireless Dimensions Corporation Adds to Mobile-Venue Suite™; Press Release, Wireless Dimensions; Allen, Texas; Jul. 26, 2000; www.wirelessdimensions.net/news.html, 2 pgs.

Battista, Stafano; Casalino, Franco and Lande, Claudio; "MPEG-4: A Multimedia Standard for the Third Millennium; Part 1"; IEEE 1999, 10 pgs.

Battista, Stafano; Casalino, Franco and Lande, Claudio; "MPEG-4: A Multimedia Standard for the Third Millennium, Part 1"; IEEE 1999, 10 pgs.

Dapeng, Wu; Hou, Yiwei Thomas; Zhu, Wenwu; Lee, Hung-Ju;Chiang, Tihao; Zhang, Ya-Qin and Chao, H. Jonathan; "*On End-to-End Architecture for Transporting MPEG-4 Video Over the Internet*" IEEE Transaction vol. 10; No. 6, Sep. 2000, 19 pgs.

Capin, Tolga K., Petajen, Eric and Ostermann, Joern; "Efficient Modeling of Virtual Humans in MPEG-4" IEEE 2000, 4 pgs.

Seeing is Believing—Motorola and PacketVideoDemonstrate MPEG4 Video Over GPRS; Publication: Business Wire Date: Wednesday, May 10, 2000; www.allbusiness.com; 4 pgs.

Office Action dated Sep. 7, 2007; U.S. Appl. No. 10/453,385, filed Jul. 30, 2003; Applicant: Tazwell L. Anderson, Jr.; 14 pages.

Office Action dated Aug. 10, 2007; U.S. Appl. No. 10/630,069, filed Jul. 30, 2003; Applicant: Tazwell L. Anderson, Jr.; 11 pages.

Office Action dated Sep. 10, 2007; U.S. Appl. No. 10/680,612, filed Oct. 7, 2003; Applicant: Tazwell L. Anderson, Jr.; 19 pages.

Office Action dated Aug. 23, 2007; U.S. Appl. No. 09/837,128, filed Apr. 18, 2001; Applicant: Tazwell L. Anderson, Jr.; 13 pages.

Sony GV S50 Video Walkman Operating Instructions; 1992; 3 pgs.

* cited by examiner

VIDEO/AUDIO SYSTEM AND METHOD ENABLING A USER TO SELECT DIFFERENT VIEWS AND SOUNDS ASSOCIATED WITH AN EVENT

CROSS REFERENCE TO RELATED APPLICATION

This document is a continuation of and claims priority to non-provisional U.S. patent application entitled "VIDEO/AUDIO SYSTEM AND METHOD ENABLING A USER TO SELECT DIFFERENT VIEWS AND SOUNDS ASSOCIATED WITH AN EVENT," assigned Ser. No. 10/453,385, and filed Jun. 3, 2003 now abandoned which is a continuation of non-provisional U.S. patent application entitled "VIDEO/AUDIO SYSTEM AND METHOD ENABLING A USER TO SELECT DIFFERENT VIEWS AND SOUNDS ASSOCIATED WITH AN EVENT," assigned Ser. No. 09/322,411, and filed May 28, 1999, now U.S. Pat. No. 6,578,203, which are incorporated herein by reference in their entirety. This document also claims priority to and the benefit of the filing date of provisional application entitled "Audio/Video Signal Distribution System for Head Mounted Displays," assigned Ser. No. 60/123,341, and filed Mar. 8, 1999, which is hereby incorporated by reference in its entirety.

BACKGROUND OF THE INVENTION

1. Field of the Invention

The present invention generally relates to video and audio signal processing techniques and, in particular, to a system and method for receiving video and audio signals from a plurality of sources and for providing a user with multiple combinations of these signals to select from.

2. Related Art

Audio and video signals are generated from a plurality of sources during many events. For example, at an auto race, television crews usually position cameras at various locations within view of a race track. These cameras generate video signals defining views of the race track from various perspectives. In addition, microphones positioned at various locations generate audio signals defining different sounds at the auto race. For example, microphones may be located close to the race track to receive sounds produced by the vehicles participating in the race, and microphones may be located close to television commentators to receive the comments of the commentators as they observe and comment on the race.

One of the video signals and one or more of the audio signals are usually selected and combined together at a television station to form a combined video/audio signal. This signal is then modulated and transmitted so that users having a television can receive the combined signal via the television. The television demodulates the combined signal and displays an image defined by the video signal on a display screen and reproduces the sounds defined by the audio signals via speakers. Therefore, the sights and sounds of the race can be viewed and heard via the television.

In addition, one or more of the audio signals, such as audio signals defining the comments of radio commentators, are usually selected and modulated at a radio station to form a radio signal. This radio signal is then transmitted as a wireless signal so that users having radios can receive the signal via a radio. The radio demodulates the signal and reproduces the sounds defined by the radio signal via speakers.

However, users viewing and/or hearing the sights and sounds of the race via televisions and/or radios are not usually given the opportunity to select which video and/or audio signals are modulated and transmitted to the television and/or radio. Therefore, the user is only able to receive the signals modulated and transmitted to the television and/or radio, even though the user may prefer to receive the other audio and/or video signals that are generated at the auto race.

Spectators who actually attend the auto race are usually given more options to view and/or hear the sights and/or sounds of the race from different perspectives. In this regard, a plurality of monitors are usually located at a particular location in the stadium. As used herein, "stadium" shall be defined to mean any non-movable structure having a large number (i.e., thousands) of seats, wherein an event occurs at (i.e., within a close proximity) of the seats such that spectators sitting in the seats can view the event. An "event" is any occurrence viewed by a spectator.

Each monitor within the stadium receives one of the aforementioned video signals and displays an image defined by the received video signal. Therefore, a spectator can view the monitor displaying the image that has a perspective desirable to the spectator. However, the monitor having the desired perspective is often not located in a convenient location for the spectator. In this regard, the spectator usually must leave his seat (or other location) in the stadium and go to a location where the spectator, along with other spectators, can view the monitor displaying the desired perspective.

Thus a heretofore unaddressed need exists in the industry for providing a system and method that enables a spectator to conveniently view an event from different perspectives.

SUMMARY OF THE INVENTION

The present invention overcomes the inadequacies and deficiencies of the prior art as discussed hereinbefore. Generally, the present invention provides a video/audio system and method for receiving video and audio signals from a plurality of sources and for providing a user with multiple combinations of these signals to select from.

The present invention includes an interface device that receives a plurality of audio and video signals from a plurality of sources. The interface device combines these signals into various combinations and transmits the combinations to a receiver. The receiver is configured to interface one of the combinations of signals with a user. In this regard, the receiver allows the user to select one of the combinations, and in response, the receiver separates the video signal(s) of the selected combination from the audio signal(s) of the selected combination. Then, the receiver renders the video signal(s) via a display device and produces a sound defined by the audio signal(s) via a speaker. Accordingly, the user is able to control which set of audio and video signals are interfaced with the user.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The preferred embodiment of the present invention will be described hereafter in the context of auto racing applications. However, the scope of the present invention should not be so limited, and it should be apparent to one skilled in the art that the principles of the present invention may be employed in the context of other applications, particularly in the context of other sporting events (e.g., football games, basketball, games, baseball games, hockey matches, etc.).

Figure 1:
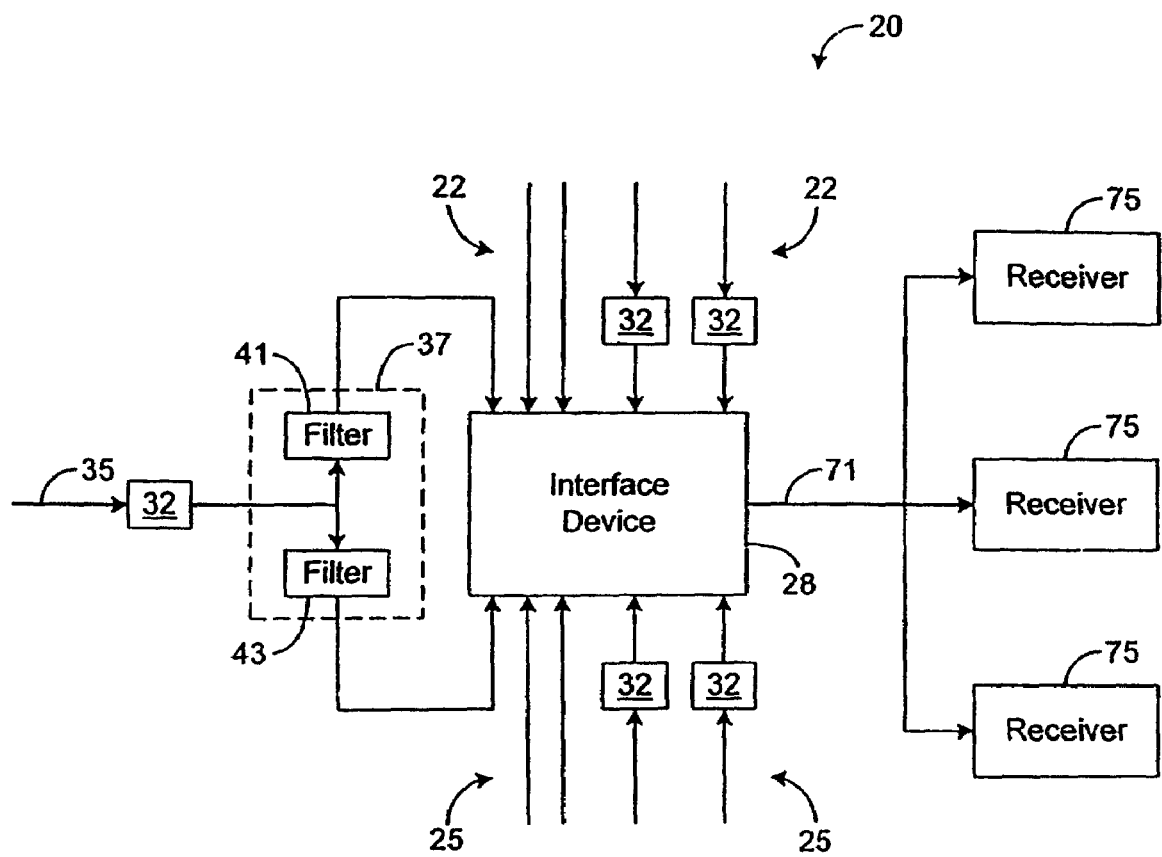
FIG. 1 is a block diagram illustrating a video/audio system in accordance with the present invention.

FIG. 1 depicts a video/audio system 20 implementing the principles of the present invention. At least one video signal 22 and at least one audio signal 25 are received by an interface device 28. Each of the received video signals 22 defines a view of the race from a different perspective. For example, the video signals 22 may be generated by different video cameras located at different locations around the stadium, including inside at least some of the vehicles participating in the race.

Furthermore, each of the audio signals 25 defines different sounds associated with the race. For example, at least one of the audio signals 25 may be generated from a microphone located close to the track or in one of the vehicles such that the audio signal 25 defines noise from the vehicles participating in the race. Alternatively, at least one of the audio signals 25 may define the comments of television commentators, and at least one of the audio signals 25 may define the comments of radio commentators. Furthermore, at least one of the audio signals 25 may define the comments between one of the drivers participating in the race and the driver's pit crew.

Some of the video and audio signals 22 and 25 can be unmodulated when transmitted to the interface device 28 and, therefore, do not need to be demodulated by the system 20. However, some of the video and audio signals 22 and 25 may need to be demodulated by the system 20. For example, at least one of the audio signals 25 defining the comments of the radio commentators may be modulated as a radio signal for transmission to radios located at or away from the stadium, and at least one of the video signals 25 may be modulated as a television signal for transmission to televisions located at or away from the stadium. In addition, the comments between a driver and the driver's pit crew are usually transmitted via ultra high frequency (UHF) radio waves, which are known to be modulated signals. Therefore, as shown by FIG. 1, the system 20 preferably includes demodulators 32 configured to receive and demodulate the video and/or audio signals 22 and 25.

It is possible for some of the video and audio signals 22 and 25 to be received from a combined signal 35, which is comprised of at least one video signal 22 combined with at least one audio signal 25. For example, the combined signal 35 may be a television signal modulated for transmission to televisions located at or away from the track stadium. To facilitate the combination of different audio signals 25 with the video signal(s) 22 defined by the combined signal 35, a separator 37 preferably separates the combined signal 35 into its respective video signal 22 and audio signal 25, as shown by FIG. 1.

Various configurations of the separator 37 may exist without departing from the principles of the present invention.

FIG. 1 depicts a possible implementation of the separator 37. In this regard, the separator 37 includes an audio signal filter 41 designed to filter out any audio signals 25 from the combined signal 35 and to transmit the resulting video signal(s) 22 to interface device 28. Furthermore, the separator 37 also includes a video signal filter 43 designed to filter out any video signals 22 from the combined signal 35 and to transmit the resulting audio signal(s) 25 to interface device 28. If more than one video signal 22 or more than one audio signal 25 is included in the combined signal 35, then the separator 37 may include additional filters (not shown) to separate the multiple video and/or audio signals 22 and 25 into individual signals before transmitting the signals 22 and 25 to the interface device 28.

Figure 2:
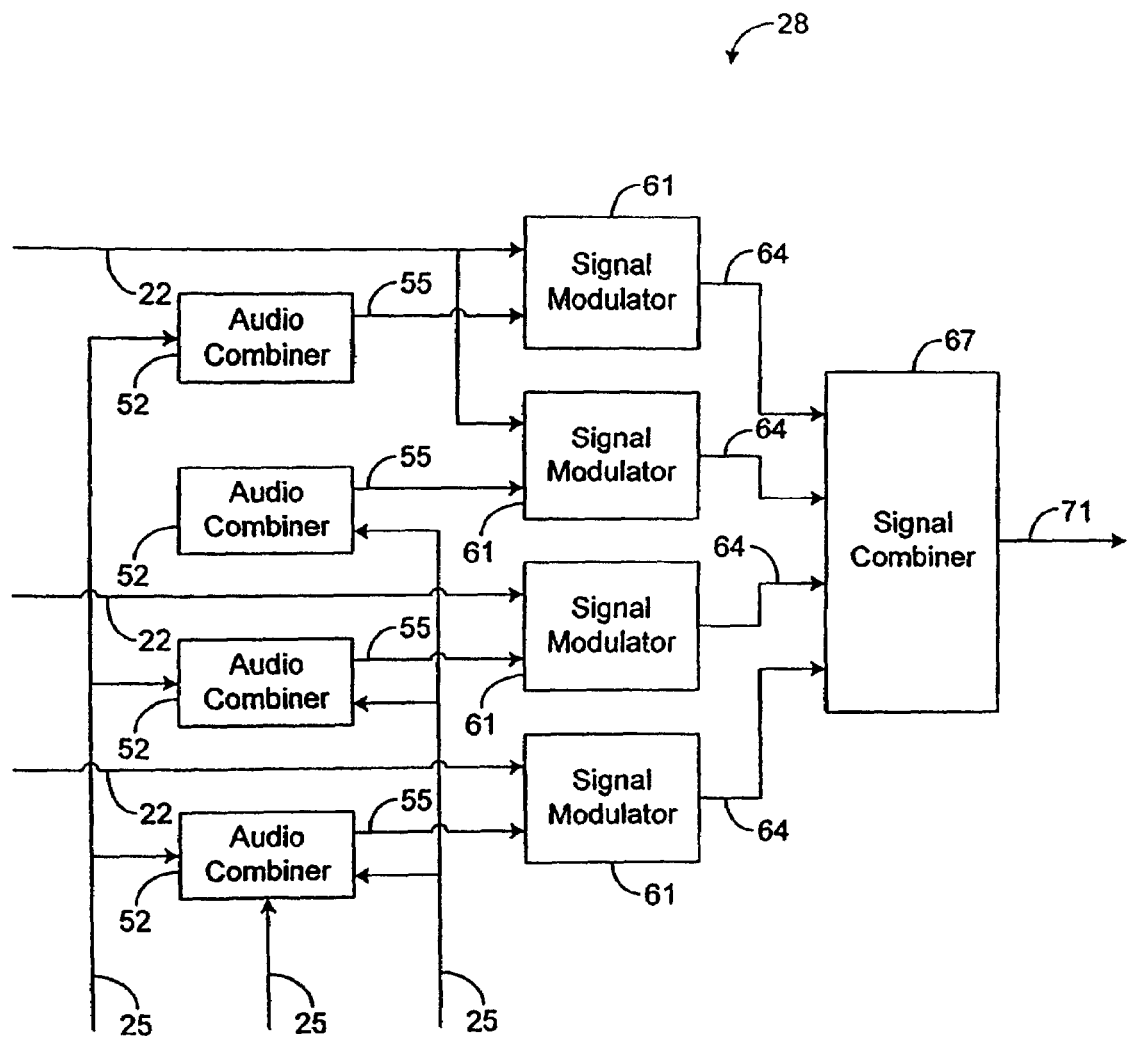
FIG. 2 is a block diagram illustrating a detailed view of an interface device depicted in FIG. 1.

FIG. 2 depicts a more detailed view of the interface device 28. The interface device 28 includes audio combiners 52 configured to receive audio signals 25 and to combine the received audio signals 25 into a single combined audio signal 55. As shown by FIG. 2, each audio combiner 52 preferably receives a different combination of audio signals 25, although it is possible for any one of the combined signals 55 to include the same combination of audio signals 25 as any other combined signal 55. Note that when an audio combiner 52 receives only one audio signal 25, the combined signal 55 output by the combiner 52 matches the one signal 25 received by the combiner 52.

As an example, one of the combined signals 55 may include an audio signal 25 defining comments between a driver and the driver's pit crew and also an audio signal 25 defining sounds (i.e., vehicular noises) received by a microphone located in the driver's vehicle. Another of the combined signals 55 may include the aforementioned audio signals 25 as well as an audio signal 25 defining a radio commentator's comments. Another combined signal 55 may only include an audio signal 25 defining a television commentator's comments. Accordingly, the combined signals 55 preferably define different combinations of sounds. It should be noted that combinations of audio signals 25 other than those described hereinabove are possible.

As shown by FIG. 2, each combined signal 55 is transmitted to a respective signal modulator 61. Each signal modulator 61 is also configured to receive a respective one of the video signals 25 received by the interface device 28. Each signal modulator 61 is configured to combine the received combined signal 55 and video signal 25 and to modulate the received signals 55 and 25 on a unique frequency range. The signal modulator 61 is then designed to transmit the modulated signal 64, which comprises the combined signal 55 and the video signal 25 received by the signal modulator 61, to a combiner 67. The combiner 67 is configured to combine each of the modulated signals 64 transmitted from each of the signal modulators 61 into a single combined (i.e., multiplexed) signal 71. This combined signal 71 is then transmitted to a plurality of receivers 75.

Various techniques exist for transmitting combined signal 71 to receivers 75. For example, a coaxial cable may be used to transmit the combined signal 71 to each of the receivers 75. In another example, the system 20 may include a wireless transmitter (not shown) that transmits the combined signal 71 to the receivers 75. Any technique for transmitting the combined signal 71 to the receivers 75 should be suitable for implementing the present invention.

Figure 3:
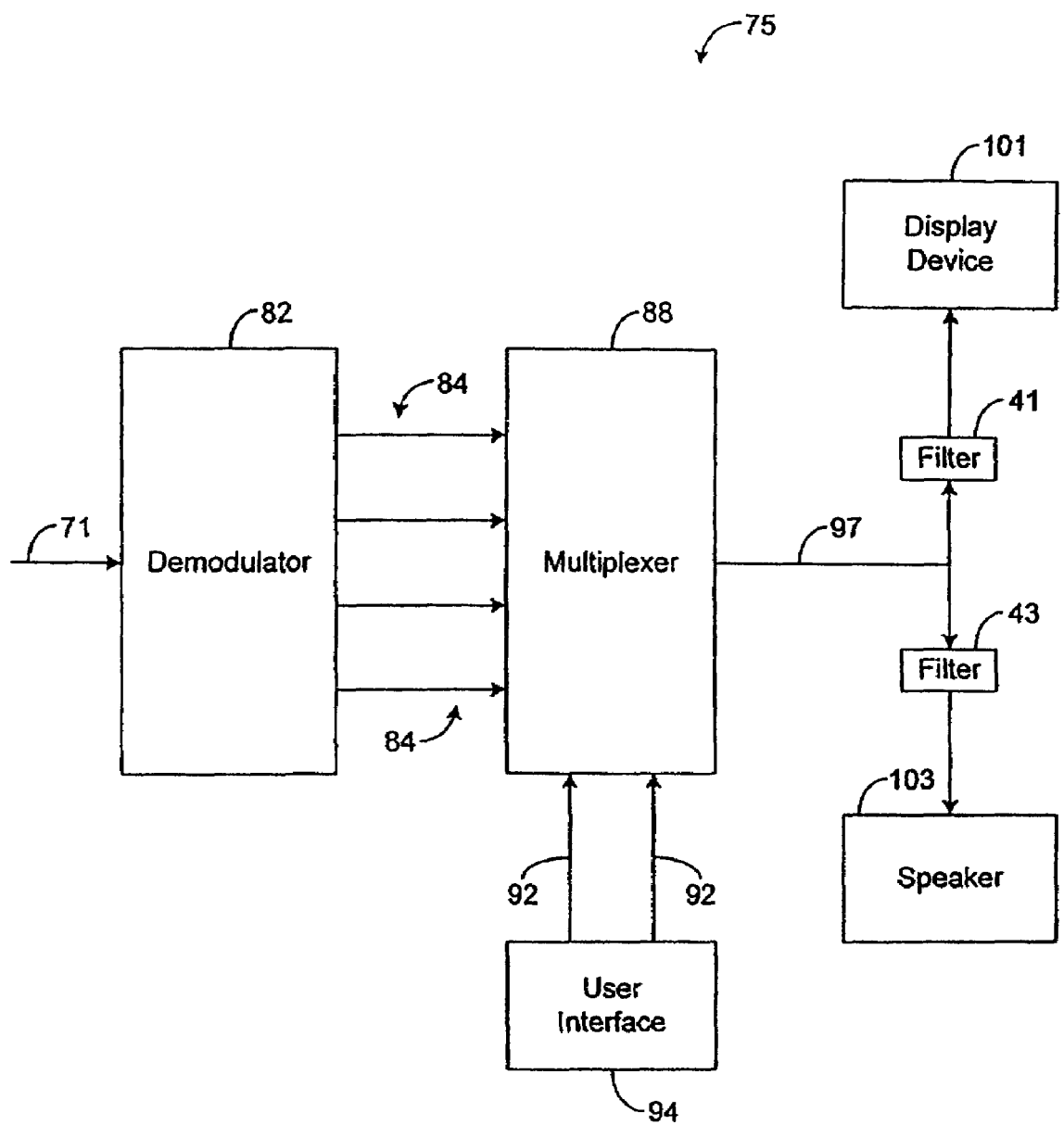
FIG. 3 is a block diagram illustrating a detailed view of a receiver depicted in FIG. 1.

A more detailed view of receiver 75 is shown by FIG. 3. Receiver 75 preferably includes a demodulator 82. The demodulator 82 is configured to demodulate the combined signal 71 and to separate (i.e., demultiplex) the combined signal 71 into signals 84 based on frequency, such that each signal 84 respectively corresponds with one of the modulated signals 64. In this regard, the demodulator 82 recovers the individual signals 64 as signals 84, and each signal 84 is, therefore, defined by the same video and audio signals 22 and 25 that define its corresponding modulated signal 64. Therefore, like modulated signals 64, each signal 84 is preferably comprised of a unique combination of video and audio signals 22 and 25.

Signals 84 are transmitted from demodulator 82 to a multiplexer 88, which also receives control signals 92 from a user interface 94. The user interface 94 preferably includes buttons or other types of switches that enable a spectator to select one of the signals 84 via control signals 92. In this regard, the multiplexer 88, through techniques well known in the art, selects one of the signals 84 based on control signals 92 and outputs the selected signal 84 as output signal 97, as shown by FIG. 3.

The receiver 75 includes an audio signal filter 41 configured to filter the audio signal(s) 25 out of signal 97. Therefore, only the video signal(s) 22 within signal 97 are transmitted to a display screen 101, which is configured to render the received video signal(s) 22 (i.e., display an image defined by the received video signal(s) 22) to the spectator.

The receiver 75 also includes a video signal filter 43 configured to filter the video signal(s) 22 out of signal 97. Therefore, only the audio signal(s) 25 within signal 97 are transmitted to a speaker 103, which is configured to produce sounds defined by the received audio signal(s) 25, through techniques well known in the art.

In the preferred embodiment, the display screen 101 and speaker 103 are included within a head mounted display (HMD), which is a well known device of the prior art. An example of a head mounted display suitable for implementing the present invention is fully described in U.S. Pat. No. 5,844,656, entitled "Head Mounted Display with Adjustment Components" and filed on Nov. 7, 1996, by Ronzani et al., which is incorporated herein by reference. Furthermore, when the combined signal 71 is transmitted via a coaxial cable, the receiver 75 may be located at a spectator's stadium seat or other convenient location. When the combined signal 71 is transmitted via a wireless transmitter, the receiver 75 is portable, and a spectator may carry the receiver 75 with him and choose where he would like to view the images and hear the sounds produced by the receiver 75.

Accordingly, the spectator may remain in his seat (or other convenient location) and control, by manipulating buttons or other types of switches in the user interface 94, which combination of video and audio signals 22 and 25 are respectively transmitted to display screen 101 and speaker 103. Therefore, the system 20 gives the spectator more flexibility in how the spectator views the race and, as a result, makes the race a more enjoyable experience.

OPERATION

The preferred use and operation of the video/audio system 20 and associated methodology are described hereafter.

Assume for illustrative purposes only that a spectator would like to attend an auto race and would like to have access to an in-car view from a camera within his favorite driver's car. In addition, the spectator would also like to continuously hear the dialogue between the aforementioned driver and the driver's pit crew, as well as the comments provided by his favorite radio commentator. It should be apparent that other views and/or sounds may be desirable in other examples.

In the past, the spectator would have to attend the race and acquire (as well as tune) a radio to receive the commentator's comments and a radio to receive the radio signals transmitted between the driver and the driver's pit crew. Then, the spectator would have to locate a monitor at the stadium displaying the in-car view that he desires to see. The spectator would then remain within sight of the monitor and listen to the two radios. If the monitor is not located in a desirable location for viewing the race, the spectator would have to choose between viewing the monitor and viewing the race at a desirable location. Furthermore, the handling of multiple radios is generally cumbersome and distracting.

However, in accordance with the present invention, the user attends the race and is provided a receiver 75 for his individual use. In the preferred embodiment, the receiver 75 is located at the spectator's seat within the stadium. However, the receiver 75 may be located at other convenient locations, and when the combined signal 71 is transmitted via a wireless transmitter, the spectator may carry the receiver 75 around with him to any desirable location in or around the stadium.

The spectator then manipulates buttons or other types of switches at user interface 94 to control which signal 84 is output by multiplexer 88 and, therefore, which signals 22 and 25 are respectively received by display 101 and speaker 103. Accordingly, the spectator may use the receiver 75 to see the desired view of the race (i.e., the in-car view) and to hear the desired sounds of the race (i.e., the sounds received by the microphone in his favorite driver's car, the dialogue between the driver and the driver's pit crew, and the comments from the radio commentator).

In this regard, the interface device 28 preferably receives at least a video signal 22 defining the in-car view of his favorite driver and a plurality of audio signals 25 defining the sounds received by the microphone in his favorite driver's car, the dialogue between the driver and the driver's pit crew, and the comments from the radio commentator. At least one of the audio combiners 52 combines these audio signals 25 into a combined signal 55. One of the signal modulators 61 receives this combined signal 55 and the video signal 22 defining the desired in-car view. This video signal 22 is modulated and combined with the foregoing combined signal 55 by one of the signal modulators 61 to create a modulated signal 64. This modulated signal 64 is combined with other modulated signals 64 and transmitted to the spectator's receiver 75 via combiner 67.

The demodulator 82 in the spectator's receiver 75 demodulates and separates the received signal 71 into separate signals 84. Based on the control signals 92 received from user interface 94, the multiplexer 88 allows only the signal 84 defined by the aforementioned video and audio signals 22 and 25 to pass. Therefore, these video and audio signals 22 and 25 are respectively transmitted to the display 101 and speaker 103 and the spectator may enjoy the view and sounds that he selected.

It should be noted that it is not necessary for the spectator to keep the receiver 75 within the stadium. In this regard, the signal 71 may be transmitted via satellites and/or communication networks to various locations around the world, and the spectator may select the view and sounds he prefers the most from just about any location capable of receiving signal 71.

It should also be noted that the receiver 75 may be retrieved from the spectator after the spectator is finished viewing the event so that the receiver can be provided to another spectator for another event at the stadium. Each spectator is preferably charged a usage fee for spectator's use of the receiver 75.

Furthermore, the present invention has been described herein in the context of auto racing. However, the system 20 may be useful in other applications as well. The system 20 would be useful in any application where it is desirable for the user to control the types of views and sounds of an event that are presented to the user. For example, the present invention could be particularly useful in any type of sporting event or other type of event attended by a large number of people.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. A content delivery network for delivering content to portable wireless handheld devices used by spectators while attending a live event, each of the portable wireless handheld devices having a wireless receiver, a display and a user interface, the network comprising:
   an interface to receive video signals from a plurality of video cameras located at the live event, the video cameras being located at different locations around the live event, the video cameras producing video signals containing live video content of the live event from different viewing perspectives;
   the interface receiving said video signals comprising at least first and second video signals—from corresponding at least first and second video cameras located at said live event, the first and second video signals containing corresponding first and second live video content of the live event from different first and second viewing perspectives; and
   a transmitter configured to wirelessly transmit said at least first and second video signals locally, in an area encompassing the live event, for reception by the wireless receivers of at least a portion of the portable wireless handheld devices at said live event and for selective display of the live video content;
   wherein, when first and second spectators select the first and second video signals, respectively, from said at least first and second video signals via the user interface of each of the corresponding first and second portable wireless handheld devices,
   i) the transmitter is configured to transmit said first video signal to the wireless receiver of the first portable wireless handheld device in a manner that enables continuous display of the first live video content on the display of the first portable wireless handheld device, wherein continuous display of the first live video content on the display of the first portable wireless handheld device is:
   a) only in response to the first spectator's selection of the first video signal for viewing while said live event occurs and
   b) until the first spectator chooses to select another live video content from another of said at least first and second video signals; and
   ii) the transmitter is configured to transmit said second video signal to the wireless receiver of the second portable wireless handheld device in a manner that enables continuous display of the second live video content on the display of the second portable wireless handheld device, wherein continuous display of the second live video content on the display of the second portable wireless handheld device is:
   a) only in response to the second spectator's selection of the second video signal for viewing while said live event occurs and
   b) until the second spectator chooses to select another live video content from another of said at least first and second video signals.

2. The content delivery network of claim 1, wherein said live event is a sporting event of one of a football game, a basketball game, a baseball game, a hockey game, golf, and an automobile race.

3. The content delivery network of claim 1, wherein one of said cameras is located in a vehicle participating in an automobile race.

4. The content delivery network of claim 1, wherein said at least first and second video signals include a video signal from one of said cameras and a television transmission signal.

5. The content delivery network of claim 1, wherein said transmitter transmits said video signals continuously over an RF link.

6. The content delivery network of claim 1, wherein said interface receives a plurality of audio signals associated with said event, said transmitter locally transmitting, for reception by the portable wireless handheld devices at said live event, said video signals and said plurality of audio signals.

7. The content delivery network of claim 6, wherein said plurality of video and audio signals define different views and different sounds of said live event and said live event is an automobile race, with said different views including in-car views, said different sounds including audio between a driver of a car and a pit crew for said driver.

8. The content delivery network of claim 1, further comprising a plurality of portable wireless handheld devices including wireless receivers for receiving said video signals, user interfaces that permit a user to select and view live video content from a single video camera uninterrupted until the user chooses to select another one of said video cameras.

9. The content delivery network of claim 8, wherein said plurality of portable wireless handheld devices each comprises a display for displaying video defined by a selected one of said video signals continuously under the control of the user through the user interface.

10. The content delivery network of claim 1, wherein said viewing perspectives are associated with locations of said plurality of video cameras.

11. The content delivery network of claim 1, further comprising a communication network for transmitting said video signals within a predetermined area adjacent said live event.

12. The content delivery network of claim 1, wherein said interface comprises a plurality of audio combiners for combining a plurality of audio signals.

13. The content delivery network of claim 1, wherein said interface comprises a plurality of signal modulators for combining an audio signal with at least one of said first and second video signals.

14. The content delivery network of claim 1, wherein said interface comprises a signal combiner for combining said video signals to form at least one combined signal for transmission.

15. The content delivery network of claim 1, wherein said transmitter transmits a plurality of multiplexed video signals carried over a carrier frequency.

16. A system providing video and audio for a live event to portable wireless handheld devices used by spectators while attending the live event, the system comprising:
   an interface configured to receive first and second video signals from first and second video recording devices at the live event, the first and second video signals containing corresponding first and second live video content of the live event from different first and second viewing perspectives; the interface configured to receive at least one audio signal from at least one audio recording device at the live event; and a transmitter configured to wirelessly transmit said first and second video signals and said at least one audio signal at said live event, in an area encompassing the live event, for reception by at least a portion of the portable wireless handheld devices at said live event and for selective display of the live video content;

wherein, when first and second spectators select the first and second video signals, respectively, via user interfaces of corresponding first and second portable wireless handheld devices, i) the transmitter is configured to transmit said first video signal to the wireless receiver of the first portable wireless handheld device in a manner that enables continuous display of the first live video content on a display of the first portable wireless handheld device, wherein continuous display of the first live video content on the display of the first portable wireless handheld device is:

c) only in response to the first spectator's selection of the first video signal for viewing while said live event occurs and d) until the first spectator chooses to select another live video content from another of said at least first and second video signals; and ii) the transmitter is configured to transmit said second video signal to the wireless receiver of the second portable wireless handheld device in a manner that enables continuous display of the second live video content on a display of the second portable wireless handheld device, wherein continuous display of the second live video content on the display of the second portable wireless handheld device is:

c) only in response to the second spectator's selection of the second video signal for viewing while said live event occurs and d) until the second spectator chooses to select another live video content from another of said at least first and second video signals.

17. The system of claim 16, further comprising portable wireless handheld devices that are provided in combination with seats for spectators of said live event.

18. The system of claim 16, further comprising a plurality of video recording devices provide a plurality of views of different locations within said live event and a plurality of audio devices provide a plurality of sounds from different locations within said event, and said portable wireless handheld devices are configured to display at least one of said plurality of views and produce audio of at least one of said plurality of sounds.

19. The system of claim 18, wherein each of said portable wireless handheld devices comprises a user interface to select any one of said received video and audio signals based upon a user input.

20. The system of claim 19, wherein each of said portable wireless handheld devices comprises at least one signal conditioner configured to condition at least one of said received video and audio signals.

21. The system of claim 20, wherein said at least one signal conditioner comprises at least one signal demodulator.

* * * * *